United States Patent
Preddy, Jr.

[15] 3,680,850
[45] Aug. 1, 1972

[54] VEHICLE SPRING CONNECTOR
[72] Inventor: L. V. Preddy, Jr., Dallas, Tex.
[73] Assignee: Dye Trucking Company, Dallas, Tex.
[22] Filed: Aug. 19, 1970
[21] Appl. No.: 65,062

[52] U.S. Cl. ..........................267/54
[51] Int. Cl. .........................F16f 1/30
[58] Field of Search........................267/54

[56] References Cited
UNITED STATES PATENTS

| | | | |
|---|---|---|---|
| 2,650,089 | 8/1953 | Martin | 267/54 |
| 1,605,362 | 11/1926 | Masury et al. | 267/54 |
| 2,691,519 | 10/1954 | Bennett et al. | 267/54 |

Primary Examiner—James B. Marbert
Attorney—Cecil L. Wood

[57] ABSTRACT

A connector for attaching tandem vehicle axles to the ends of leaf suspension springs which support the vehicle frame through a trunnion shaft supported centrally of the spring. The ends of the master leaf of the leaf spring assembly are downturned to define transverse lips. The connector includes a housing, mounted on the axle, made up of two superimposed sections defining an elongated L-shaped cavity to accommodate and retain the end portion of the spring assembly including the transverse lip of the master leaf. The end portion of the spring assembly is enclosed in a resilient boot accommodated within the L-shaped recess, whereby the spring is resiliently supported within the recess and retained by means of the lip.

9 Claims, 4 Drawing Figures

PATENTED AUG 1 1972 3,680,850

INVENTOR.
L.V. Preddy, Jr.
BY
Cecil L. Wood
ATTORNEY

VEHICLE SPRING CONNECTOR

BACKGROUND AND SUMMARY OF THE INVENTION

This invention relates to the spring suspension of vehicles, and more particularly to means for connecting the ends of a vehicle leaf spring to a wheel axle.

This invention has particular application to the mounting of a tandem axle wheel unit on a trailer, such as is described in applicant's prior U.S. Pat. No. 3,371,941, issued Mar. 5, 1968, and entitled Axle Assembly for Dumptrucks. In the patent, there is disclosed coupling means for securing the ends of the leaf springs to the tandem axles of a wheel unit, wherein the ends of the springs are received in a housing wherein the springs are retained therein by means of a boss formed in a section of the housing which is received in a transverse aperture in the master leaf. The coupling between the housing and the leaf spring is, of course, subject to many and varied forces during the normal use of the vehicle, inherently resulting in wear of the frictionally engaging surfaces of the boss and of the spring. Excessive wear of these parts results in relative motion or play between the spring and the axle assembly, with the potential hazard that the excessive wear will permit the spring to disengage from the boss resulting in a loss of coupling between the spring and the axle.

This invention then is concerned with an improved coupling between the spring and the tandem axle which obviates these problems.

An object of this invention is to provide an improved spring mounted means for a tandem axle unit.

Another object of this invention is to provide an improved spring-to-axle mounting means wherein the spring includes an integral key confined within the housing member.

A further object of this invention is to provide improved connectors for coupling leaf springs to tandem axles so as to take up or absorb the driving force and torque in a manner to minimize wear and prevent distortion and breakage of the parts of the connectors and the spring ends.

A still further object of this invention is to provide an improved, confined spring mounting means including a resilient liner to reduce frictional wear between the mating parts.

A connector according to the invention for accomplishing these objects includes two-part housing for attachment to a shaft such as an axle, the housing defining an L-shaped cavity. The master leaf of the leaf spring includes an upturned lip defining a retaining key at each end, and the end portions of the leaf spring, including the master leaf lips, are enclosed in a resilient boot and confined within the housing cavity.

The novel features of the invention, as well as additional objects and the advantages thereof, will be understood more fully from the following description when read in connection with the accompanying drawings, in which.

Figure 2:
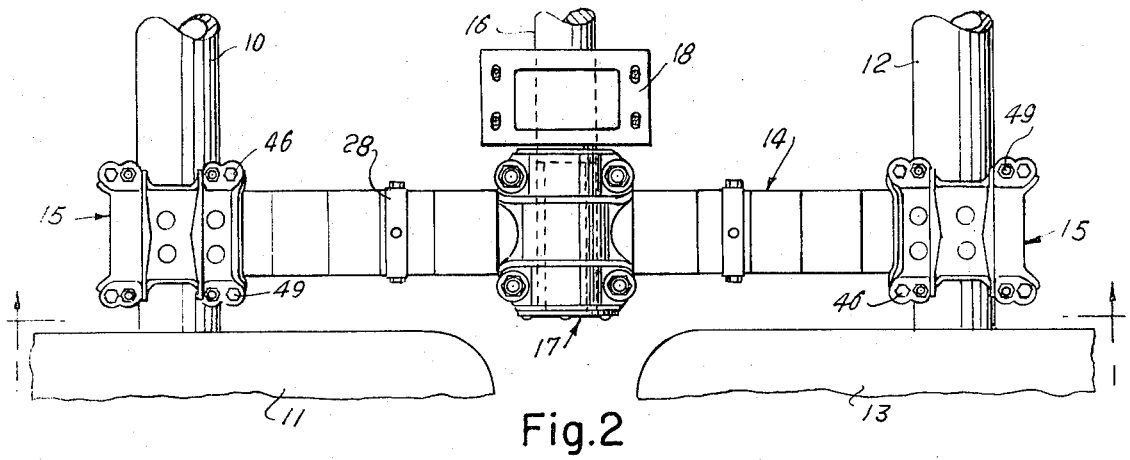
FIG. 2 is a fragmentary plan view of the wheel unit, taken along the line 2—2 of FIG. 1.
Figure 1:
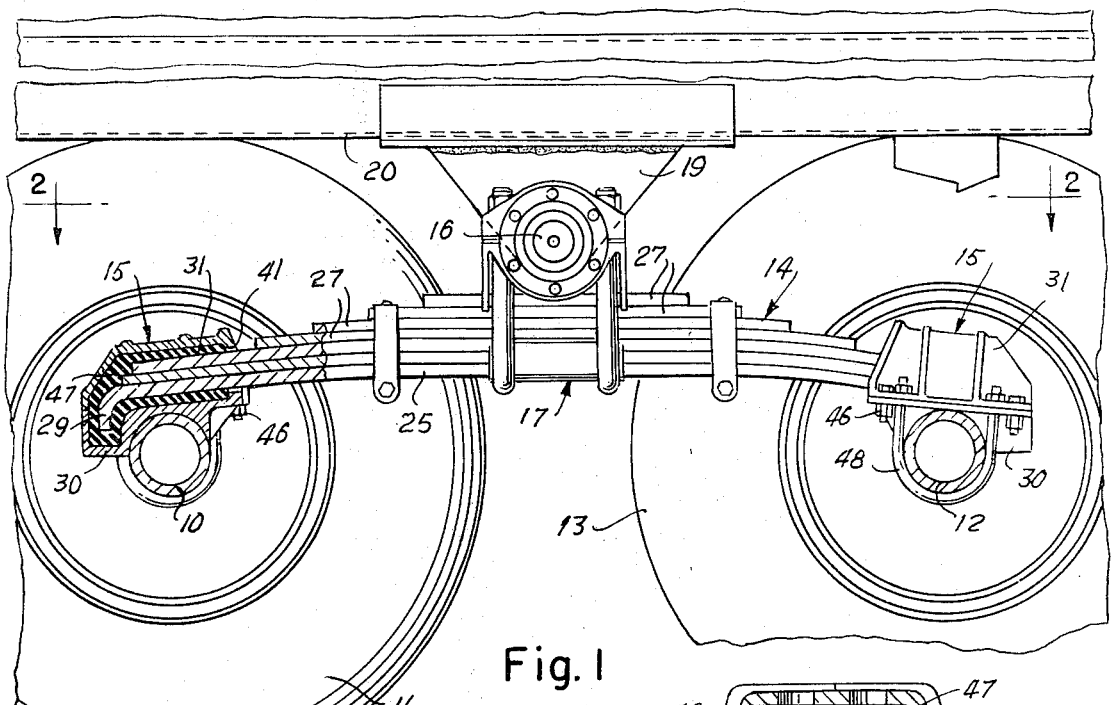
FIG. 1 is a fragmentary side elevation view, partially in section, of a vehicle with leaf spring suspension for a tandem axle wheel unit.

FIGS. 1 and 2 of the drawing illustrate, fragmentarily, a tandem axle wheel unit which is particularly adapted for use with a large trailer vehicle of a tractor-trailer unit, for example. As shown in the drawings, the wheel unit includes tandem axles 10 and 12, each axle rotatably supporting at least one wheel, 11 and 13 respectively, at each end thereof. The tandem axles 10 and 12 are maintained in spaced and aligned relation by means of a pair of leaf springs 14 disposed at opposite sides of the vehicle and having connectors 15 at each end for connecting the springs and the axles, the connectors 15 being a subject of this invention.

The springs 14 are pivotally connected to a trunnion shaft 16, by means of a suitable shackle and bearing assembly 17 such as are described in detail in the above-mentioned U.S. Pat. No. 3,371,941. The trunnion shaft 16, which extends transversely of the vehicle body, may be secured to the body by means of platform members 18 suitably clamped to the trunnion shaft for supporting stools 19 which are rigidly secured to the vehicle frame 20 by means of welding for example. The vehicle frame 20 is represented by longitudinal frame members in FIG. 1 of the drawing.

In a tandem axle wheel unit as above described, the leaf springs 14, through the bearing assembly 17, may pivot about the trunnion shaft to permit one or the other of the wheels 11 and 13 to rise above the other as necessitated by irregularities in the surface traversed by the vehicle. The entire trailer load is supported through the leaf springs and axles, and the leaf springs, through the connectors 15, maintain the appropriate alignment of the axles 10 and 12. Necessarily then large and varied forces are absorbed through the connectors 15 between the axles 10 and 12 and the leaf springs 14.

Figure 3:
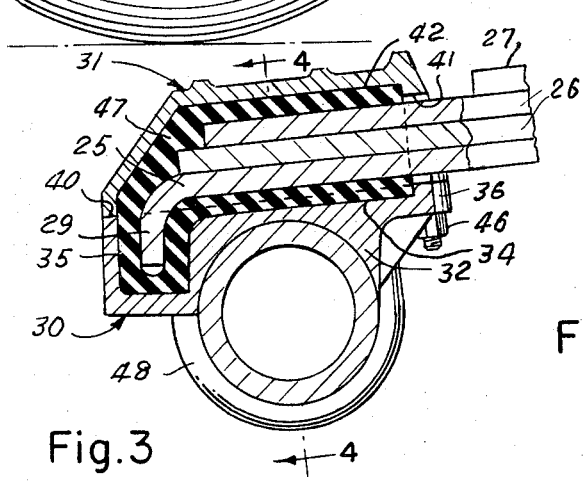
FIG. 3 is an enlarged sectional view of the coupling between the leaf spring and the wheel axle, as seen in FIG. 1.
Figure 4:
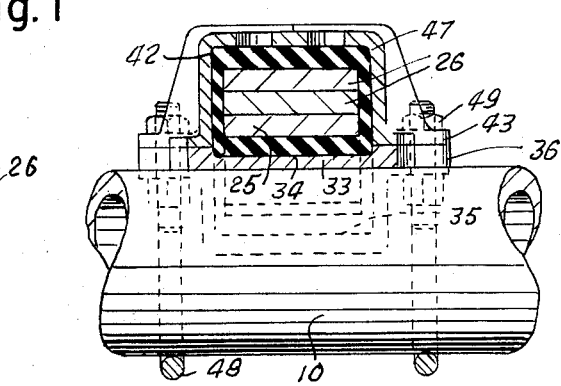
FIG. 4 is a sectional view, taken along the line 4—4 of FIG. 3, with the axle being shown in elevation.

The connectors 15, at each end of the leaf springs 14 are identical in structure and FIGS. 3 and 4 of the drawing are particularly illustrative of the connector 14 shown in FIGS. 1 and 2 as being secured to the axle 10.

The leaf spring 14, as best seen in FIG. 1, is of generally conventional construction, including a master leaf 25 which is the longest of the leaves, a pair of adjacent leaves 26 which are of diminishing length but nearly as long as the master leaf 25, and additional leaves 27 of diminishing length. The leaves may be held in assembled relation by conventional clamps or shackles 28. The end portions of the master leaf 25, which extend beyond the adjacent leaves 26, are downturned to define transverse lips 29.

As best seen in FIGS. 3 and 4, a connector 15 includes a two-part housing made up of a base portion 30 and a cap portion 31. The base portion 30 defines an arcuate saddle 32 for engagement with the axle 10 and a platform 33 to which the cap portion 31 is secured. The platform 33 defines an elongated seat 34 in the form of a shallow groove and, at one end of the seat, a recess 35 extending transversely from the seat 34. The base portion platform also includes four ears 36 disposed generally at the corners of the platform, and provided with apertures for securing the connector housing parts together and for securing the connector to the axle as will be described.

The cap portion 31 is a box-like member having one open face 40, for engagement with the base platform 33, and also having an opening 41 in one end wall opening to the interior chamber 42 of the cap portion which is also provided with ears 43 which extend laterally therefrom in the plane of the open face 40, the ears being provided with apertures disposed for alignment with the apertures of the base portion ears 36.

The cap portion 31 is secured to the base portion 30 by means of four nut-bolt assemblies 46, one such assembly clamping each pair of adjacent ears 36 and 43 and, in assembled relation, the housing portions provided an L-shaped cavity defined by the cover portion chamber 42 and the base portion recess 35, with the cover opening 41 defining an opening to the cavity.

For coupling the connector 15 to the leaf spring 14, the end portions of the master leaf 25 and the adjacent leaves 26 are enclosed by a resilient boot 47, fabricated of rubber or neoprene for example, which completely encloses the end portion of the leaf spring including the master leaf lip 29. Prior to assembling the housing base and cap portions, the boot encased leaf spring end portion is accommodated on the base portion seat 34 with the lip 29 extending downwardly into the recess 35. The cap portion is then placed to enclose the leaf ends 25 and 26, and the housing parts are clamped together by the nut-bolt assemblies 46 to secure the connector assembly. While the leaf spring is clamped relatively tight within the housing cavity because of the resilient boot 47, the spring is also positively retained within the connector housing by the transverse lip 29 which extends into the connector recess 35.

After assembly of the connector 15 to the leaf spring 14, the connector is secured to the axle 10 by means of U-bolts 48 which enclose the axle and extend through aligned apertures in the housing ears 36 and 43, and mating nuts 49, which bear against the cap portion ears 43.

In accordance with this invention, the ends of the leaf springs are set in rubber, or other resilient material, in such manner as to provide flexibility in all directions where needed, and the leaf spring is used to form a positive connection between the two tandem axles so that the two axles are always maintained substantially parallel and the correct alignment of the wheels is insured with respect to the longitudinal axis of the trailer or other vehicle.

A particular feature and advantage of this connector arrangement is that, with the ends of the leaf springs being completely set in rubber, metal-to-metal frictional wear between the leaf springs and the connectors is eliminated providing for long and effective life of the connectors and spring assembly.

Although the invention has been described with reference to a particular preferred embodiment, many changes and modifications will become apparent to those skilled in the art in view of the foregoing description which is intended to be illustrative and not limiting of the invention defined in the claims.

What is claimed is:

1. A connector for coupling to a vehicle axle one end of a suspension leaf spring having a depending lip on one end of the master leaf of said spring, said connector comprising a housing having a base portion and a cap portion, and means for clamping said base portion and said cap portion together to define an L-shaped cavity open at one end; means for securing said assembled housing to a vehicle axle;

an L-shaped, thin walled boot member of resilient material having an L-shaped cavity open at one end for enclosing the end portion of said leaf spring including said master leaf lip, and being dimensioned to closely confine the spring end portion;

and said housing cavity being dimensioned to accommodate and closely confine the enclosed leaf spring end portion whereby the leaf spring is positively retained within said housing.

2. A connector as set forth in claim 1 wherein said housing base portion includes a relatively elongated, generally flat platform for supporting of said leaf spring master leaf, and a relatively shallow recess transverse to said platform for accommodating said master leaf lip; and wherein said housing cap portion defines a chamber confronting said platform and said recess, said chamber and said recess defining said L-shaped cavity.

3. In combination:

a leaf spring; a depending lip on one end of the master leaf of said spring;

a housing, for securing said spring to a axle member, defining an L-shaped cavity for accommodating the end portion of said leaf spring including said master leaf lip; said housing comprising a base portion having saddle means for engagement with a shaft member, and a cap portion coacting with said base portion to define said cavity;

an L-shaped, thin walled, resilient boot member defining an L-shaped cavity open at one end closely enclosing said leaf spring end portion; and means for clamping together said housing base portion and cap portion to confine and retain said boot enclosed end portion of said leaf spring.

4. The combination set forth in claim 3 wherein said leaf spring end portion includes said master leaf and one or more adjacent leaves; and wherein said resilient boot member is fabricated as a sleeve to enclose said master leaf lip and said leaf spring end portion including said master leaf and said one or more adjacent leaves.

5. The combination set forth in claim 3 wherein said housing base portion defines a relatively elongated, generally flat platform for supporting said leaf spring end portion and a relatively shallow recess in said platform for accommodating said master leaf lip; and wherein said housing cap portion defines a chamber confronting said platform and said recess; and said chamber and said recess defining said L-shaped cavity.

6. The combination set forth i claim 5 wherein said housing cap portion is provided with an opening in one end wall; said end wall defining lip means for retaining said boot within said cavity.

7. The combination set forth in claim 6 wherein said base portion platform defines a shallow groove confronting said cap portion chamber; said shallow groove and said chamber defining the leg portion of said L-shaped cavity;

wherein said platform groove terminates short of the open end of said housing; said platform thereby defining a lip for retaining said boot within said housing cavity.

8. In a tandem axle wheel unit for a vehicle, including a pair of wheel axles arranged in tandem, a pair of leaf springs each connected between the tandem axles at one side of the unit, the master leaf of each leaf spring having a depending transverse lip at each end, and a load carrying shaft connected between the springs intermediate the spring ends for supporting the body of the vehicle the improvement comprising connector means for securely and resiliently connecting the ends of said leaf springs to said axles, each of said connector means comprising:

a housing having a base portion and a cap portion; means for clamping said base portion and said cap portion together to define an L-shaped cavity open at one end; means for securing said housing to a vehicle axle;

an L-shaped, thin walled boot member of resilient material having an L shaped cavity open at one end and dimensioned to closely enclose the end portion of a leaf spring including said master leaf lip;

and said housing L-shaped cavity being dimensioned to accommodate and closely confine said boot enclosed leaf spring end whereby the spring is positively retained within said housing.

9. The combination as set forth in claim 8 wherein said housing base portion includes a relatively elongated, generally flat platform for supporting said leaf spring master leaf, and a relatively shallow recess transverse to said platform for accommodating said master leaf lip; and wherein said housing cap portion defines a chamber confronting said platform and said recess, said chamber and said recess defining said L-shaped cavity.

* * * * *